United States Patent
Satoh et al.

(10) Patent No.: US 7,447,578 B2
(45) Date of Patent: Nov. 4, 2008

(54) STEERING CONTROL APPARATUS AND METHOD FOR AUTOMOTIVE VEHICLE

(75) Inventors: Hiroshi Satoh, Kanagawa (JP); Masaki Watanabe, Kanagawa (JP)

(73) Assignee: Unisia JKC Steering Systems Co., Ltd., Kanagawa (JP)

( * ) Notice: Subject to any disclaimer, the term of this patent is extended or adjusted under 35 U.S.C. 154(b) by 297 days.

(21) Appl. No.: 10/812,915

(22) Filed: Mar. 31, 2004

(65) Prior Publication Data
US 2004/0204808 A1 Oct. 14, 2004

(30) Foreign Application Priority Data
Apr. 14, 2003 (JP) .............................. 2003-109065

(51) Int. Cl.
*A01B 69/00* (2006.01)
*B62D 6/00* (2006.01)
*G05D 1/00* (2006.01)

(52) U.S. Cl. ........................... 701/41; 701/28; 701/301; 701/302; 180/421; 180/446

(58) Field of Classification Search ................... 701/41, 701/28, 301, 302; 180/421, 446
See application file for complete search history.

(56) References Cited

U.S. PATENT DOCUMENTS

| 6,112,845 A | 9/2000 | Oyama et al. |
| 6,748,302 B2 | 6/2004 | Kawazoe |
| 2001/0016793 A1* | 8/2001 | Ikemoto .................... 701/41 |
| 2002/0095246 A1 | 7/2002 | Kawazoe |
| 2003/0045983 A1* | 3/2003 | Kondo et al. ............... 701/41 |
| 2004/0107035 A1* | 6/2004 | Tange et al. ................ 701/70 |
| 2004/0153228 A1* | 8/2004 | Matsumoto et al. ......... 701/41 |
| 2005/0182539 A1* | 8/2005 | Maass ........................ 701/41 |

FOREIGN PATENT DOCUMENTS

| EP | 1 298 021 A1 | 4/2003 |
| JP | 11-147483 A | 6/1999 |
| JP | 2002-120744 A | 4/2002 |
| JP | 2002-211428 A | 7/2002 |
| JP | 2002-302058 A | 10/2002 |
| JP | 2003-081123 A | 3/2003 |

* cited by examiner

*Primary Examiner*—Khoi H. Tran
*Assistant Examiner*—Brian J Broadhead
(74) *Attorney, Agent, or Firm*—Foley & Lardner LLP

(57) ABSTRACT

In steering control apparatus and method for an automotive vehicle, a camera photographs a travel path in a traveling direction of a vehicle, a lateral displacement calculating circuit calculates a lateral displacement of the vehicle with respect to the travel path according to an image of the travel path photographed by the camera, a differentiator calculates a differential value of the lateral displacement, a vehicle speed sensor that detects a vehicle speed, a relative yaw rate calculating section calculates a relative yaw rate with respect to the travel path of the vehicle on the basis of the lateral displacement, the differential value of the lateral displacement, and the vehicle speed, an actuator provides an assistance force for the steering mechanism, and an actuator controlling section drivingly controls the actuator in a direction toward which the relative yaw rate is cancelled on the basis of the relative yaw rate.

3 Claims, 5 Drawing Sheets

YAW RATE SIGNAL

DETECTED YAW RATE SIGNAL

YAW RATE SIGNAL
(AFTER FILTER PROCESS)

YAW RATE SIGNAL AFTER BAND PASS FILTER PROCESS

YAW RATE SIGNAL AFTER CONTROL EXECUTION

YAW RATE SIGNAL AFTER CONTROL EXECUTION
(BAND PASS FILTER PROCESS)

STEERING CONTROL APPARATUS AND METHOD FOR AUTOMOTIVE VEHICLE

BACKGROUND OF THE INVENTION

1. Field of the Invention

The present invention relates generally to steering control apparatus and method for an automotive vehicle which perform a steering assistance so as to cancel a yaw rate variation of the vehicle.

2. Description of the Related Art

A Japanese Patent Application First Publication No. Heisei 11-147483 published on Jun. 2, 1999 (particularly, refer to FIG. 7b) (which corresponds to a U.S. Pat. No. 6,112,845 issued on Sep. 5, 2000) exemplifies a previously proposed steering control system which calculates a steering correction quantity which is a multiplication of a gain determined in accordance with a vehicular yaw rate and a vehicle speed during a steering and causes a steering assistance torque to be acted upon a steering system to perform a steering assistance in order to direct the vehicular yaw rate toward a vehicular stability direction.

SUMMARY OF THE INVENTION

However, in a technique disclosed in the above-described Japanese Patent Application First Publication, it is effective to cancel the yaw rate developed due to an undulation (or swell) of a road surface. However, to exert the steering assistance in an opposite direction to a steering direction of the vehicle toward which the driver steers, there is a possibility that a worsening of a steering feeling such as a heavy burden on the steering operation may be introduced.

In addition, since a gain provided for the yaw rate variation described above is larger than the gain of the yaw rate variation due to an external disturbance of the road surface such as convex and recess (undulation or swell) in road surface, a sufficiently large control gain cannot be set for the yaw rate variation due to the road surface external disturbance and an advantage such that the vehicular stability is achieved against the road surface external disturbance cannot be obtained.

It is, therefore, an object of the present invention to provide steering control apparatus and method for an automotive vehicle which are capable of performing a steering operation in accordance with an intention of the driver and are capable of performing the steering assistance to cancel only such a yaw rate variation as no intention of the driver.

According to one aspect of the present invention, there is provided with a steering control apparatus for an automotive vehicle, comprising: a camera photographing a travel path in a traveling direction of a vehicle; a lateral displacement calculating circuit that calculates a lateral displacement of the vehicle with respect to the travel path according to an image of the travel path photographed by the camera; a differentiator that calculates a differential value of the lateral displacement; a vehicle speed sensor that detects a vehicle speed; a relative yaw rate calculating section that calculates a relative yaw rate with respect to the travel path of the vehicle on the basis of the lateral displacement, the differential value of the lateral displacement, and the vehicle speed; an actuator that provides an assistance force for the steering mechanism; and an actuator controlling section that drivingly controls the actuator in a direction toward which the relative yaw rate is cancelled on the basis of the relative yaw rate.

According to another aspect of the present invention, there is provided a steering control method for an automotive vehicle, comprising: photographing a travel path in a traveling direction of a vehicle using a camera; calculating a lateral displacement of the vehicle with respect to the travel path according to an image of the travel path photographed by the camera; calculating a differential value of the lateral displacement; detecting a vehicle speed; calculating a relative yaw rate with respect to the travel path of the vehicle on the basis of the lateral displacement, the differential value of the lateral displacement, and the vehicle speed; providing a steering assistance force for the steering mechanism using an actuator; and drivingly controlling the actuator in a direction toward which the relative yaw rate is cancelled on the basis of the relative yaw rate.

The other objects and features of this invention will become understood from the following description with reference to the accompanying drawings.

DETAILED DESCRIPTION OF THE PREFERRED EMBODIMENT

Reference will hereinafter be made to the drawings in order to facilitate a better understanding of the present invention.

Figure 1:
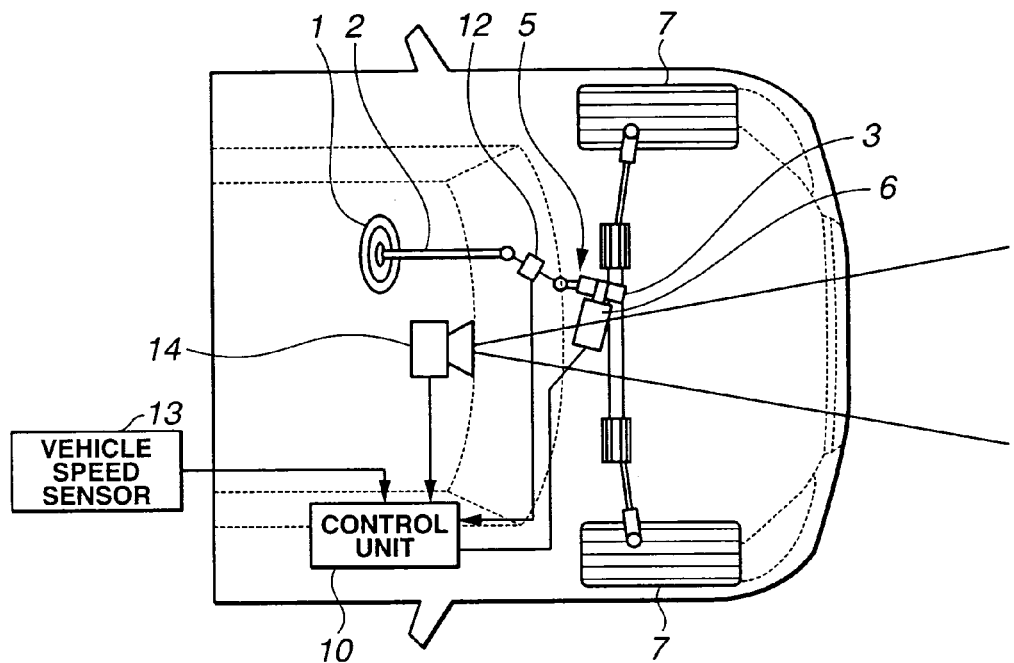
FIG. 1 shows a rough configuration view representing a power steering system to which a steering control apparatus in a preferred embodiment according to the present invention is applicable.

FIG. 1 is a system configuration view of a power steering system of an automotive vehicle to which a preferred embodiment of a steering control apparatus according to the present invention is applicable.

A reference numeral 1 denotes a steering wheel, a reference numeral 2 denotes a steering shaft, a reference numeral 3 denotes a rack-and-pinion gear mechanism, a reference numeral 5 denotes a power steering mechanism which assists a steering force exerted by a vehicle driver, a reference numeral 6 denotes an electrically driven motor, reference numerals 7 denote wheels, and a reference numeral 10 denotes a control unit (or controller) to mainly control power steering mechanism 5.

Power steering mechanism 5 transmits a revolution of electric motor 6 to a speed-reduction mechanism installed on a steering shaft 2. In addition, the torque sensor 12 is installed to detect a steering torque exerted by the driver. Control unit 10 receives a steering torque signal from torque sensor 12, a vehicle speed signal from a vehicle speed sensor 13, and photographed images from a CCD camera 14. Control unit 10 outputs a command signal to electrically driven motor 6 on the basis of these inputted signals.

Figure 2:
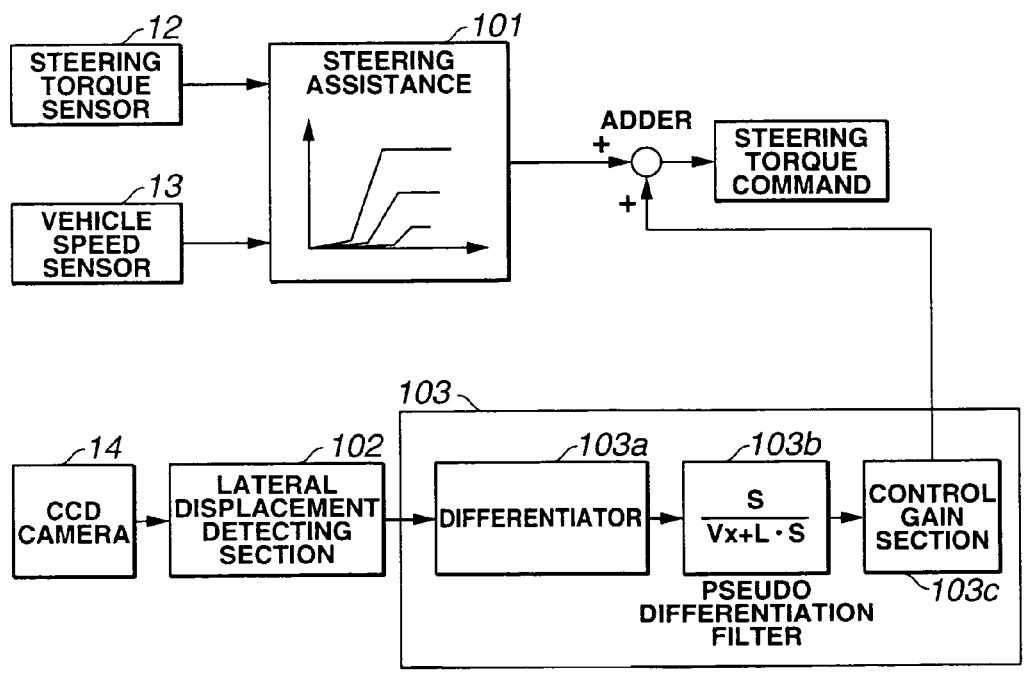
FIG. 2 is a functional block diagram of a control unit of the steering control apparatus in the preferred embodiment according to the present invention.

FIG. 2 shows a block diagram representing a functional structure within control unit 10 shown in FIG. 1. In FIG. 2, a numeral 101 denotes a steering assistance control section which calculates a steering assistance quantity on the basis of the inputted torque signal and vehicle speed signal. A reference numeral 102 denotes a lateral displacement detecting section that detects a lateral displacement Y between an estimated position of the vehicle at a distance L predetermined ahead of the vehicle and a target object (for example, a white line). A relative yaw rate controlling section 103 estimates a relative yaw rate by means of a filtering on the basis of the detected lateral displacement and calculates a stability direction steering quantity toward which the vehicle become stable on the basis of the estimated relative yaw rate signal.

Relative yaw rate controlling section 103 includes: a differentiator 103a which differentiates the detected lateral displacement, a pseudo differentiation filter 103b constituted by predetermined forward distance L and the vehicle speed; and a control gain section 103c that provides a control gain in a direction to cancel the relative yaw rate extracted by pseudo differentiation filter 103b and outputs the stability direction steering quantity. A steering torque command value finally outputted to electric motor 6 is formed as a sum between the steering assistance quantity calculated by the steering assistance control section 101 and the stability direction steering quantity calculated by relative yaw rate controlling section 103.

Figure 3:
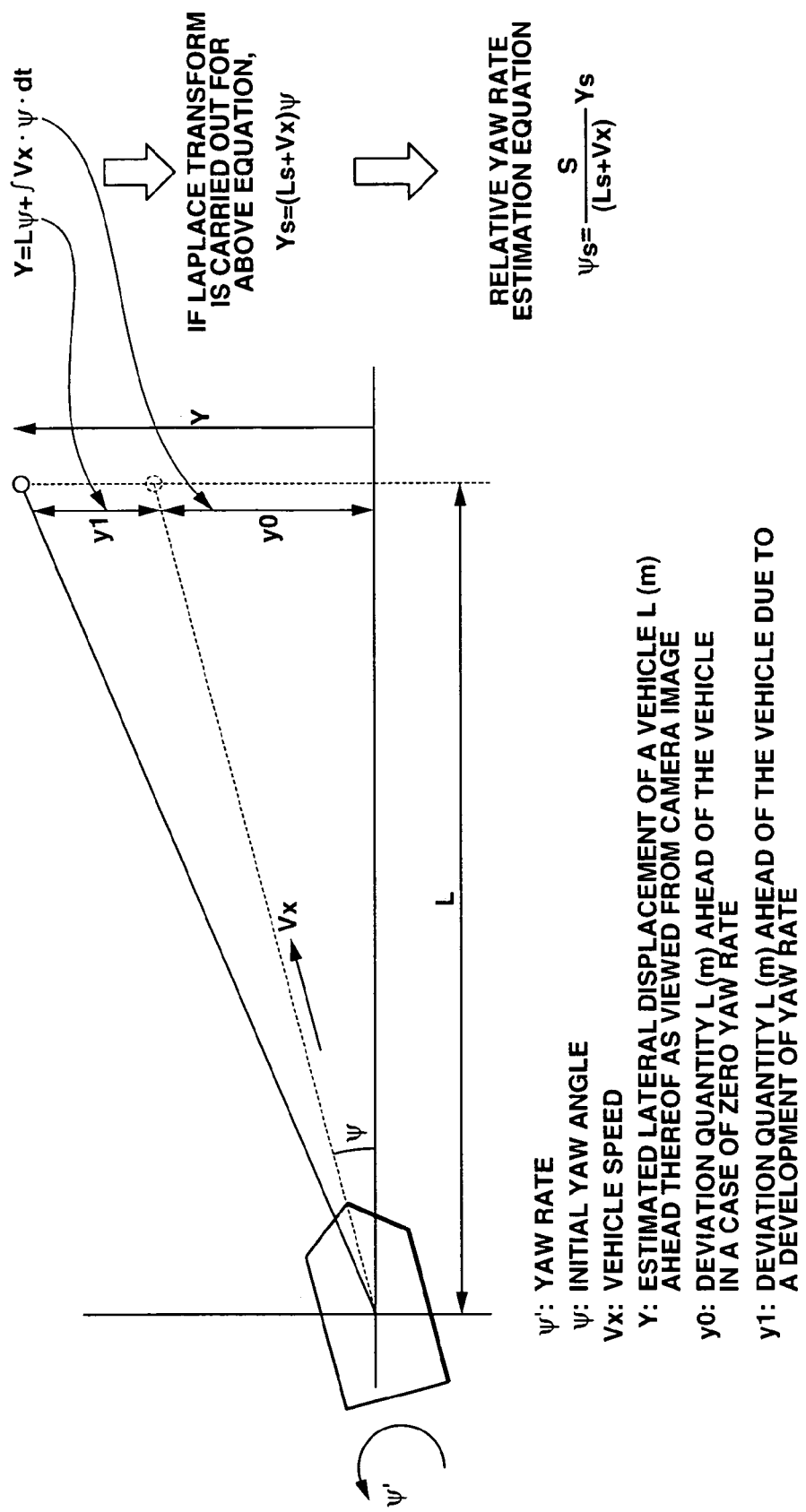
FIG. 3 is an explanatory view for explaining a relative yaw rate estimation theory described in the preferred embodiment of the steering control apparatus shown in FIGS. 1 and 2.

Hereinafter, lateral displacement detecting portion 102 and relative yaw rate controlling section 103 will be described. FIG. 3 shows an explanatory view for explaining a theory of estimation on the relative yaw rate. Suppose that a recognition of the white line on the road surface which is the target object is carried out from the photographed image of camera 14. Each parameter at a certain point of place will be described below.

yaw rate: $\psi'$ initial yaw angle: $\psi$ vehicle speed: Vx estimated lateral displacement from the white line at predetermined forward distance L as viewed from camera photographed image: Y lateral displacement at predetermined forward distance L in a case where the yaw rate is zero; y0 deviation quantity at predetermined forward distance L due to the development of the yaw rate; y1. At this time, the following equation (1) is established:

$$Y=L\psi+\int Vx\cdot\psi'\cdot dt \quad (1).$$

If a Laplace transform is carried out for above equation (1), the following equation (2) is established:

$$Ys=(Ls+Vx)\psi \quad (2).$$

Since yaw rate is a variation rate of the yaw angle, the relative yaw rate moment to the white line is represented in the following equation:

$$\psi'=\psi s=\{s/(Ls+Vx)\}\cdot Ys \quad (3).$$

It is noted that s denotes a Laplace transform operator (Laplace variable).

From equation (3), Ys corresponds to differentiator 103a differentiating the inputted estimated lateral displacement and $\{s/(Ls+Vx)\}$ corresponds to pseudo differentiation filter 103b. For estimated relative yaw rate $\psi$s, control gain is provided from control gain section 103c in a direction that estimated relative yaw rate $\psi$s is cancelled so that the stability direction steering quantity is determined.

In general, a detection ability of a yaw rate sensor mounted in a generally available vehicle is as follows:

resolution>several deg/s (at least larger than 1 deg/s)

a temperature drift at zero point>several deg/s (at least larger than 1 deg/s)

On the other hand, the detection ability at the relative yaw rate estimation in the case of the present invention is as follows:

resolution>0.06 deg/s temperature drift at zero point is basically not present. The present invention is feasible as described above. That is to say, since the calculation is carried out on the basis of the photographed image of camera 14, it is possible to determine the resolution according to a level of the number of pixels of the camera 14. Especially, due to the detection from the positional information through the image, an influence due to the temperature is not at all received. Consequently, a stable detection accuracy can be secured.

Figure 4:
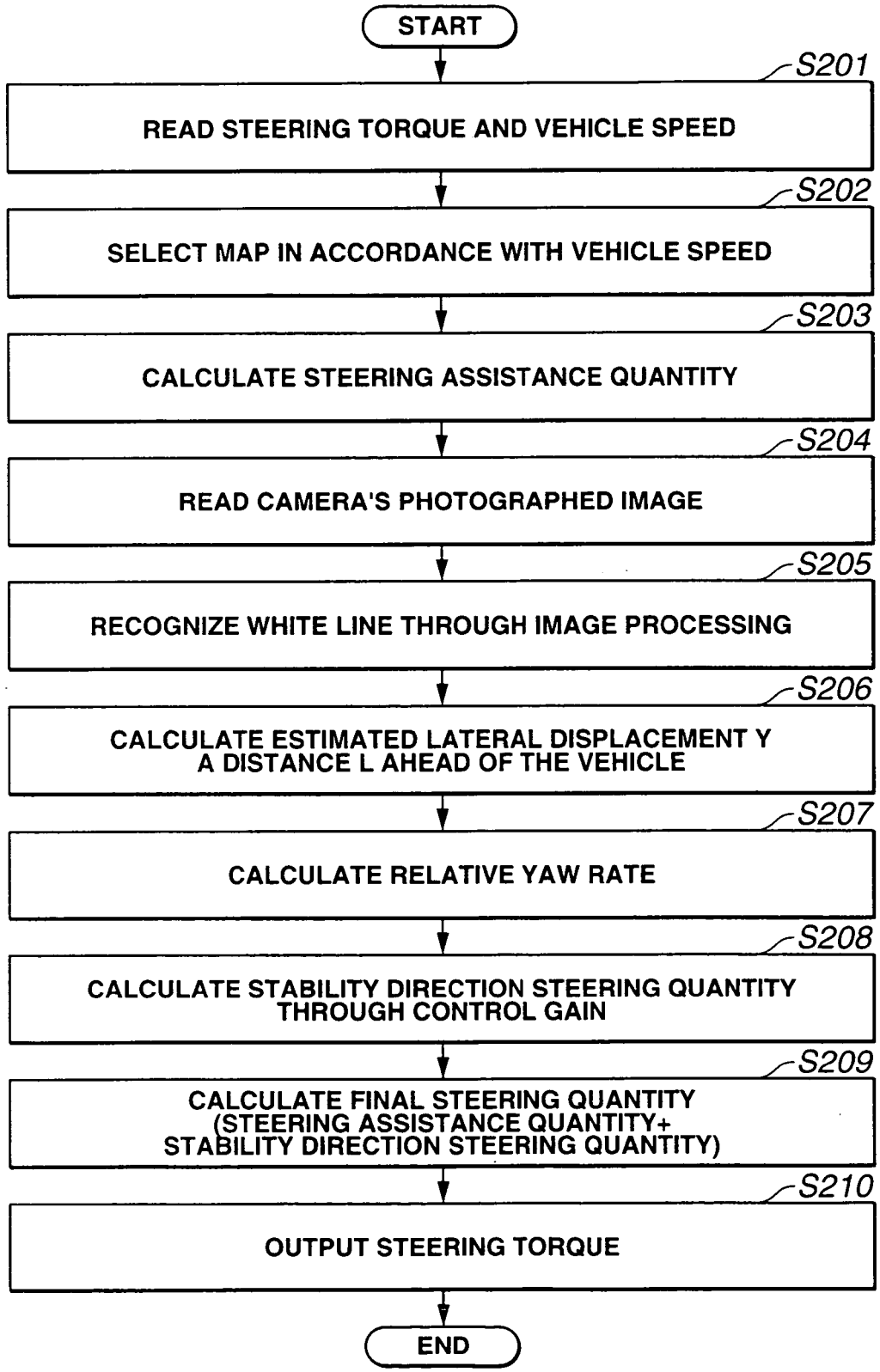
FIG. 4 is an operational flowchart representing a steering control procedure executed in the preferred embodiment of the steering control apparatus according to the present invention.

FIG. 4 shows an operational flowchart representing the control contents of the steering angle of the first preferred embodiment shown in FIG. 2.

(Steering assistance quantity calculation process) At a step 201, control unit 10 reads steering torque and vehicle speed from torque sensor 12 and vehicle speed sensor 13, respectively. At a step 202, control unit 10 selects a map to set a steering assistance quantity in accordance with the steering torque and the vehicle speed. At a step 203, the steering assistance quantity is calculated by control unit 10 on the basis of the map of the steering assistance quantity selected at step 202.

(Lateral displacement calculation process) At a step 204, control unit 10 reads the photographed image of camera 14. At a step 205, control unit 10 executes the recognition of the white lines on both ends of the travel path through an image processing. At a step 206, control unit 10 calculates estimated lateral displacement Y at the predetermined forward distance L.

(Relative yaw rate calculation processing) At a step 207, control unit 10 calculates the relative yaw rate on the basis of estimated lateral displacement Y, vehicle speed Vx, and predetermined forward distance L.

(Stability direction steering angular displacement calculation processing) At a step 208, control unit 10 calculates the stability direction steering quantity according to the control gain.

(Final steering assistance quantity) At a step 209, control unit 10 calculates a final steering quantity as a sum of the steering assistance quantity and the stability direction steering quantity. At a step 210, control unit 10 outputs the steering torque based on a final steering quantity from electric motor 6.

Figure 5:
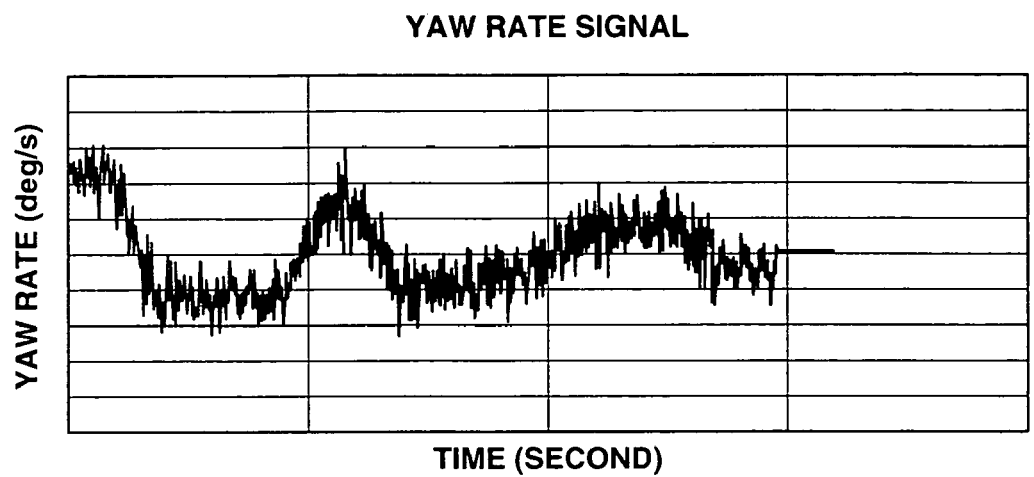
FIG. 5 is a view of a yaw rate signal before a relative yaw rate control executed in the preferred embodiment of the steering control apparatus shown in FIG. 1.
Figure 6:
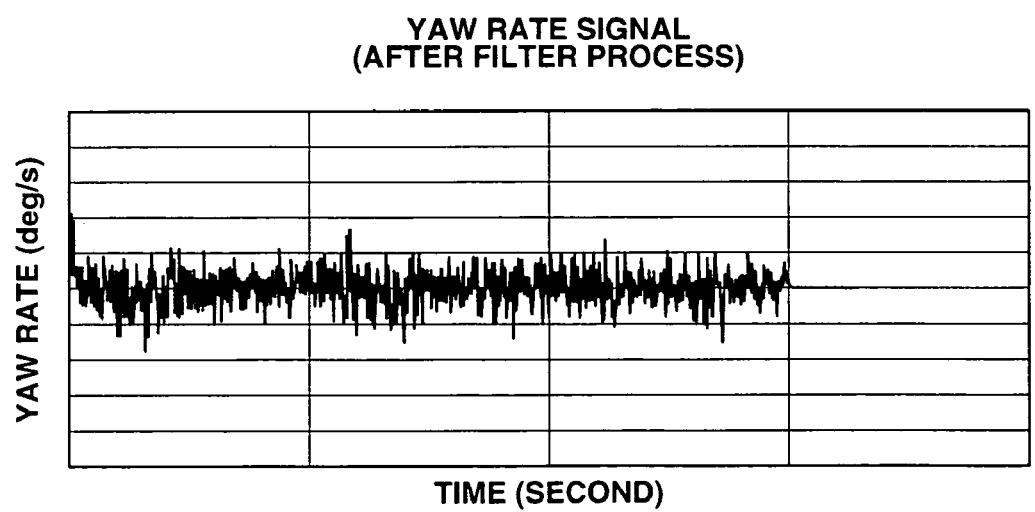
FIG. 6 is a view of a relative yaw rate signal through an image processing before the relative yaw rate control in the preferred embodiment of the steering control apparatus shown in FIG. 1.

Next, specific contents of the above-described control will be described below. FIG. 5 shows an absolute yaw rate signal developed on the vehicle. FIG. 6 shows a relative yaw rate signal calculated on the basis of an information from camera 14. The yaw rate signal shown in FIG. 5 includes a signal having a low frequency band developed due to the steering by the driver. On the other hand, as shown in FIG. 6, the relative yaw rate signal is the yaw rate signal to the white line and does not include the signal components due to the steering with the driver steered along the white line of the road so that the yaw rate signal to the white line only is detected such as the road surface external disturbance inputted due to the convex and recess of the road surface. Control gain section 103c provides a gain to cancel the filtered processed yaw rate signal as shown in FIG. 6 and outputs the stability direction steering quantity.

Figure 7:
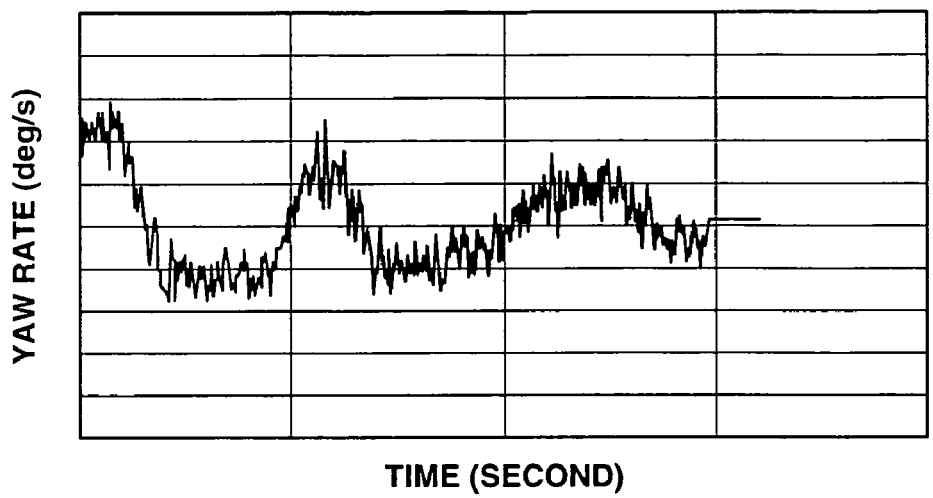
FIG. 7 is a view of the yaw rate signal after the relative yaw rate control in the preferred embodiment of the steering control apparatus shown in FIG. 1.
Figure 8:
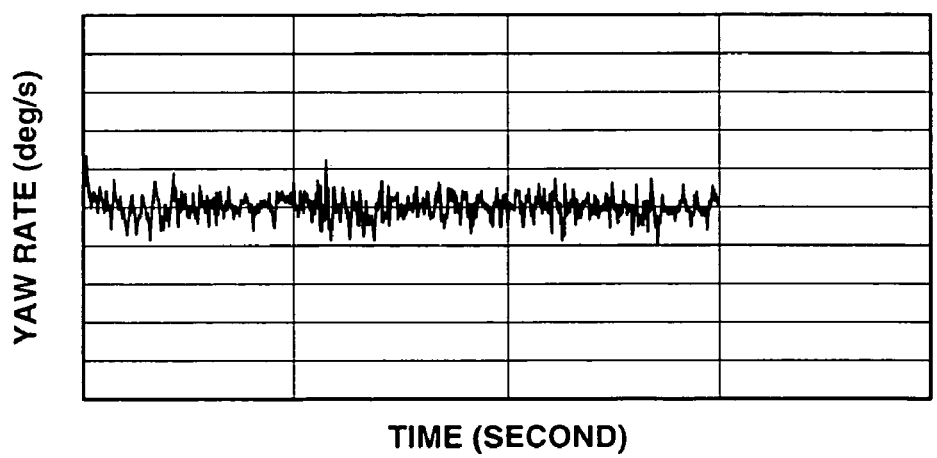
FIG. 8 is a view of the relative yaw rate signal through the image processing after the yaw rate control in the preferred embodiment of the steering control apparatus shown in FIG. 1.

FIG. 7 shows the yaw rate signal developed on the vehicle after the relative yaw rate control execution. FIG. 8 shows the relative yaw rate signal after the execution of the relative yaw rate control. It will be appreciated that, as shown in FIG. 7, the yaw rate signal of low frequency developed according to the steering by the driver is kept as it is and, as shown in FIG. 8, the signal of an intermediate frequency band which is the disturbance such as the convex and recess of the road surface is cancelled at a high level.

As described above, the steering quantity to cancel only the relative yaw rate signal with respect to the white lines (target object) from the photographed image of camera 14 is given. Hence, the steering quantity to cancel the yaw rate developed due to the steering by the driver (yaw rate developed in a case where the vehicle is traveling along the white line) is not given. While executing the steering assistance in accordance with the driver's steering operation, a compatibility of improvement in the vehicular stability for the relative yaw rate variation developed due to the external disturbance can be achieved.

The entire contents of a Japanese Patent Application No. 2003-109065 (filed in Japan on Apr. 14, 2003) are herein incorporated by reference. The scope of the invention is defined with reference to the following claims.

What is claimed is:

1. A steering control apparatus for an automotive vehicle, comprising:
   a camera photographing a travel path in a traveling direction of a vehicle;
   a lateral displacement calculating circuit that calculates a lateral displacement of the vehicle with respect to the travel path according to an image of the travel path photographed by the camera;
   a differentiator that calculates a differential value of the lateral displacement;
   a vehicle speed sensor that detects a vehicle speed;
   a relative yaw rate calculating section that calculates a relative yaw rate with respect to the travel path of the vehicle on the basis of the lateral displacement, the differential value of the lateral displacement, and the vehicle speed;
   an actuator that provides an assistance force for the steering mechanism; and
   an actuator controlling section that drivingly controls the actuator in a direction toward which the relative yaw rate is cancelled on the basis of the relative yaw rate,
   wherein the actuator controlling section outputs a steering torque command value to the actuator, the steering torque command value being a sum of a steering assistance quantity calculated on the basis of a steering torque and the vehicle speed and a stability direction steering quantity calculated on the basis of the calculated relative yaw rate, and
   wherein the actuator controlling section comprises a relative yaw rate controlling section comprising:
   a differentiator that differentiates the lateral displacement;
   a pseudo differentiation filter constituted by a predetermined forward distance (L) and the vehicle speed; and
   a control gain section that provides a control gain in the direction toward which the relative yaw rate extracted from the pseudo differentiation filter is cancelled and outputs the stability direction steering quantity.

2. A steering control apparatus for an automotive vehicle as claimed in claim 1, wherein the actuator controlling section comprises a steering assistance controlling section that calculates the steering assistance quantity on the basis of a steering torque and the vehicle speed.

3. A steering control apparatus for an automotive vehicle as claimed in claim 2, wherein the actuator comprises an electrically driven motor of a power steering mechanism of the vehicle.

* * * * *